(12) United States Patent  
Chen

(10) Patent No.: US 7,441,841 B1
(45) Date of Patent: Oct. 28, 2008

(54) BICYCLE WHEEL RIM

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 0 days.

(21) Appl. No.: 12/061,152

(22) Filed: Apr. 2, 2008

(51) Int. Cl.
*B60B 21/02* (2006.01)
(52) U.S. Cl. ............... 301/95.104; 301/58; 301/95.106
(58) Field of Classification Search .............. 301/55, 301/58, 67, 73, 79, 95.101, 95.104, 95.106, 301/95.107, 95.108; 29/894.35
See application file for complete search history.

(56) References Cited

U.S. PATENT DOCUMENTS

| | | | | |
|---|---|---|---|---|
| 365,091 A | * | 6/1887 | Owen | 280/200 |
| 5,499,864 A | * | 3/1996 | Klein et al. | 301/95.104 |
| 5,653,510 A | * | 8/1997 | Osborne | 301/30 |
| 6,089,672 A | * | 7/2000 | Chen | 301/58 |
| 6,145,937 A | * | 11/2000 | Chen | 301/58 |
| 6,186,598 B1 | * | 2/2001 | Chen | 301/58 |
| 6,402,255 B1 | * | 6/2002 | Chen | 301/95.101 |
| 6,502,906 B1 | * | 1/2003 | Chen | 301/58 |

* cited by examiner

*Primary Examiner*—Russell D Stormer
(74) *Attorney, Agent, or Firm*—The Webb Law Firm

(57) ABSTRACT

A bicycle wheel rim includes an annular rim body having a rim axis and including left and right annular side walls, two annular first oblique walls, two annular second oblique walls, an annular base wall that interconnects the second oblique walls, and left and right annular connecting walls. Each first oblique wall extends from a respective side wall and has an edge opposite to the respective side wall. The edges of the first oblique walls are disposed on an imaginary cylindrical plane. Each second oblique wall extends from a respective first oblique wall. Each connecting wall extends from the base wall to a respective side wall. Each first oblique wall has a radial inner side forming an angle with the imaginary cylindrical plane that ranges from 15 to 65 degrees.

14 Claims, 7 Drawing Sheets

BICYCLE WHEEL RIM

BACKGROUND OF THE INVENTION

1. Field of the Invention

The invention relates to a wheel rim, more particularly to a bicycle wheel rim.

2. Description of the Related Art

An ideal bicycle wheel rim requires some features, including a relatively good rigidity, a relatively high strength, a relatively light weight, and a structure which facilitates insertion of a tire but which makes it difficult for the tire to be taken off. However, these features usually contradict one another.

As shown in FIG. 1, a conventional bicycle wheel rim 10 includes a pair of annular side walls 101, an annular base wall 102 interconnecting radial inner ends of the side walls 101, a pair of annular first extending walls 104 extending obliquely from the base wall 102 to a respective one of the side walls 101, and a pair of annular second extending walls 103 extending from a respective one of the first extending walls 104 to a corresponding one of the side walls 101. The middle portion of the base wall 102 protrudes radially and outwardly relative to the radial inner ends of the side walls 101. The presence of double extending walls results in a relatively high strength but a relatively heavy weight for the wheel rim 10. Moreover, the design of double extending walls also results in a relatively long radial depth (H) of an interior tire-retaining space such that, once an inserted tire 106 is punctured, a consequent deflation thereof can cause the tire 106 to be taken off easily. Furthermore, each of the extending walls 103 has a connecting segment 105 radially perpendicular to the base wall 102, thereby hindering sliding of tire beads 107 of the tire 106 during inflation.

As shown in FIG. 2, another conventional bicycle wheel rim 20 includes a pair of annular side walls 201, an annular base wall 202 interconnecting radial inner edges of the side walls 201 and forming an arch configuration, and an annular reinforcing wall 203 interconnecting radial outer parts of the side walls 201 and connected to the annular base wall 202. Each of the annular side walls 201 is thicker at a radial inner part that is connected to the base wall 202. The double-layer, i.e., the reinforcing wall 203 and the base wall 202, and the thicker parts of the annular side walls 201 result in a higher strength. Although the radial depth (H) of the interior tire-retaining space of this conventional wheel rim 20 is shorter than that of the previous conventional bicycle wheel rim 10, the disposition of the reinforcing wall 203 results in a relatively heavy weight for the conventional wheel rim 20.

FIG. 3 illustrates yet another conventional bicycle wheel rim 30 that includes a pair of annular side walls 301, an annular base wall 302 interconnecting radial inner edges of the side walls 301 and forming an arch configuration, and an annular reinforcing wall 303 interconnecting radial outer parts of the side walls 301 and connected to the annular base wall 302. The base wall 302 is thicker at left and right parts thereof that are connected respectively to the side walls 301. The double-layer, i.e., the reinforcing wall 303 and the base wall 302, and the thicker parts result in a higher strength. Although the radial depth (H) of the interior tire-retaining space of this conventional wheel rim 30 is shorter than that of the first conventional bicycle wheel rim 10, the presence of the reinforcing wall 303 results in a relatively heavy weight for this conventional wheel rim 30.

In co-pending U.S. patent application Ser. No. 11/726,841 filed by the applicant, there is disclosed a bicycle wheel rim including a pair of annular side walls, a pair of oblique walls that extend respectively from radial inner ends of the side walls, an annular base wall that interconnects the oblique walls, and a pair of annular connecting walls, each of which extends from the base wall and extends radially outward relative to a respective one of the oblique walls. The side walls cooperate with the oblique walls, the base wall, and the connecting walls to form a symmetrical truss structure with a relatively high strength. Additionally, since the interior space of the wheel rim of the co-pending application is relatively small, the deformation of a tire retained thereon that may cause the tire to be taken off the wheel rim will be effectively reduced. Moreover, when retaining the tire on the wheel rim of this application, since the connecting walls are oblique, tire beads of the tire can slide respectively and smoothly on the connecting walls during inflation of the tire.

SUMMARY OF THE INVENTION

An object of the present invention is to provide a bicycle wheel rim having a high strength and a lighter weight.

Accordingly, a bicycle wheel rim of the present invention is adapted for retaining a tire and a plurality of spokes thereon, and includes an annular rim body. The rim body has a horizontally disposed rim axis and includes left and right annular side walls, a pair of annular first oblique walls, a pair of annular second oblique walls, an annular base wall, and left and right annular connecting walls. The left and right annular side walls are spaced apart from each other and surround the rim axis. Each of the annular side walls has a radial inner edge and a radial outer edge relative to the rim axis. Each of the first oblique walls extends obliquely from a respective one of the annular side walls in radial inward directions relative to the rim axis, and has a first edge connected to the radial inner edge of the respective one of the annular side walls and a second edge opposite to the first edge. The second edges of the first oblique walls are disposed on an imaginary cylindrical plane. Each of the second oblique walls extends obliquely from a respective one of the first oblique walls in radial outward directions relative to the rim axis, and has a first annular edge connected to the second edge of the respective one of the first oblique walls and a second annular edge opposite to the first annular edge. The base wall interconnects the second annular edges of the second oblique walls, has a radial outer side opposite to the rim axis, has opposite left and right ends, cooperates with the second oblique walls to form an arch configuration that opens toward the rim axis, and is formed with a plurality of spoke fixing holes. The left annular connecting wall extends from the left end of the base wall to connect to the left annular side wall. The right annular connecting wall extends from the right end of the base wall to connect to the right annular side wall. Each of the left and right annular connecting walls is disposed radially outward relative to a respective one of the first oblique walls and a respective one of the second oblique walls, and cooperates with a connected one of the annular side walls, the respective one of the first oblique walls, and the respective one of the second oblique walls to define an annular hole. Each of the first oblique walls has a radial inner side forming a first angle with the imaginary cylindrical plane that ranges from 15 to 65 degrees.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
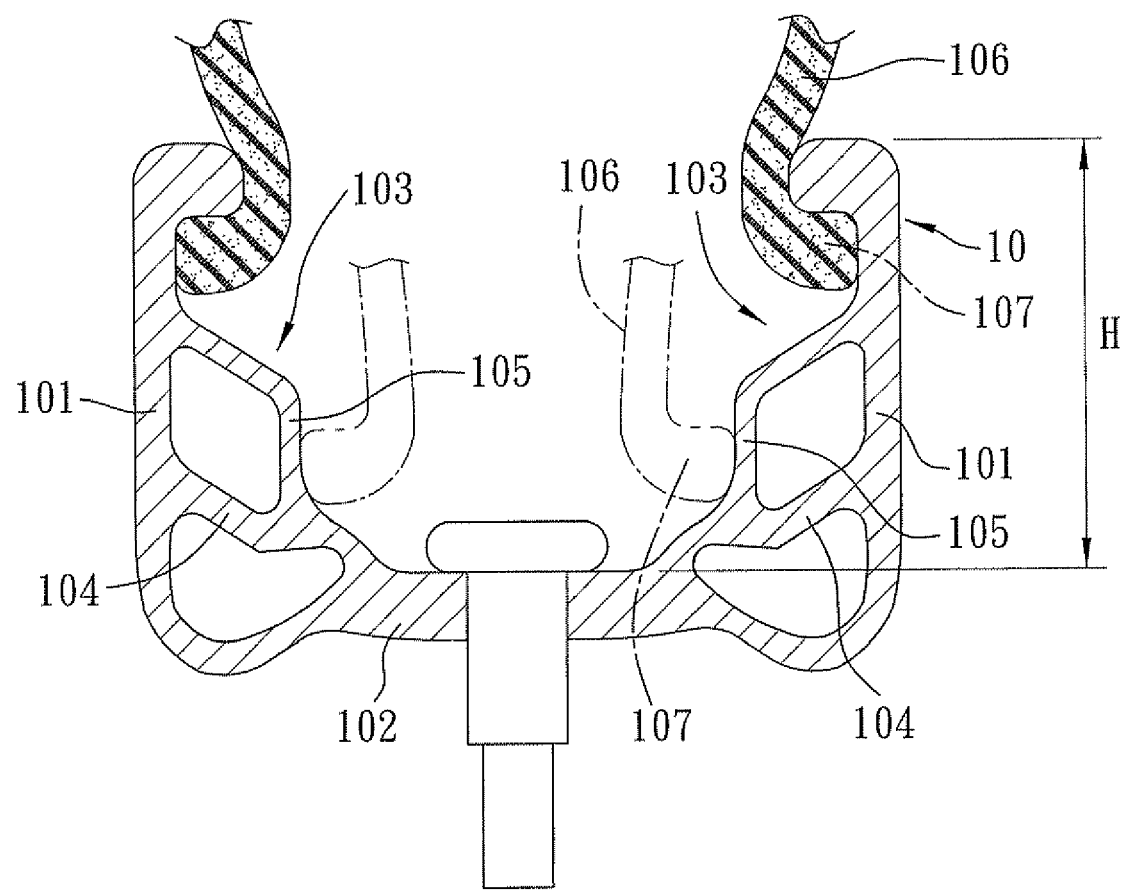
FIG. 1 is a sectional schematic view of a conventional bicycle wheel rim.
Figure 2:
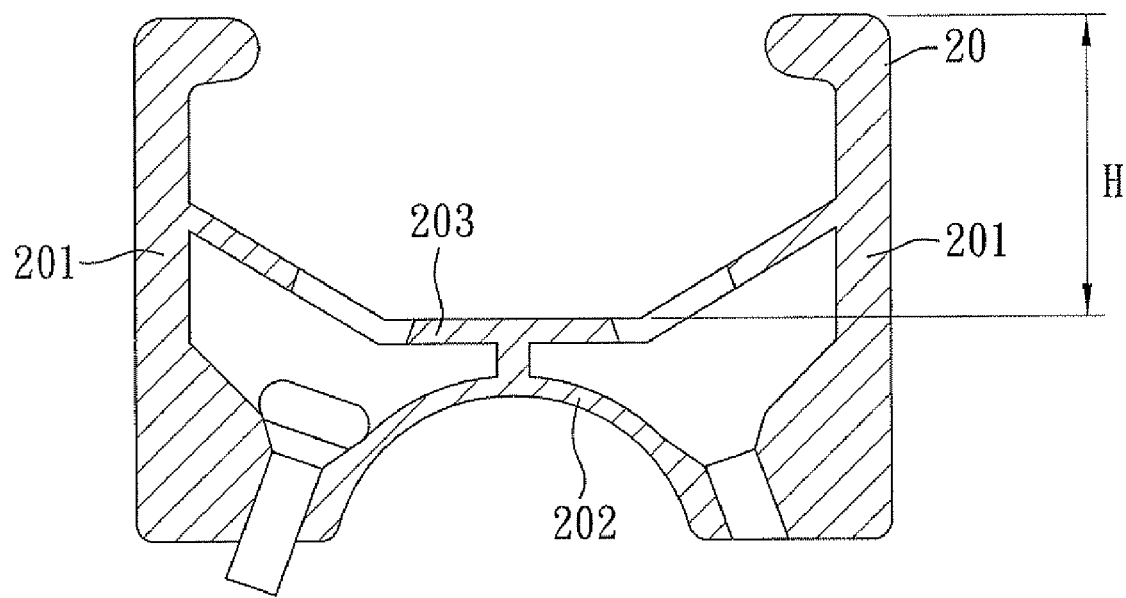
FIG. 2 is a sectional schematic view of another conventional bicycle wheel rim.
Figure 3:
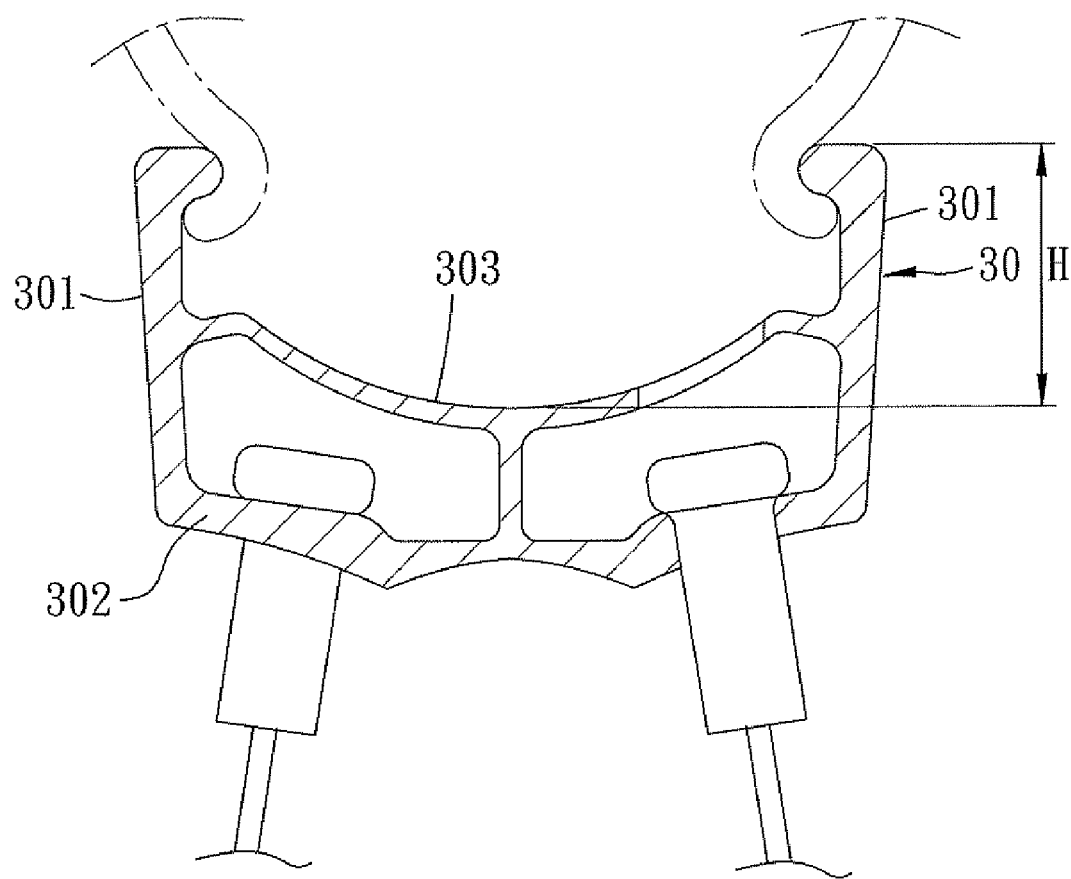
FIG. 3 is a sectional schematic view of yet another conventional bicycle wheel rim.

Before the present invention is described in greater detail, it should be noted that like elements are denoted by the same reference numerals throughout the disclosure.

Figure 4:
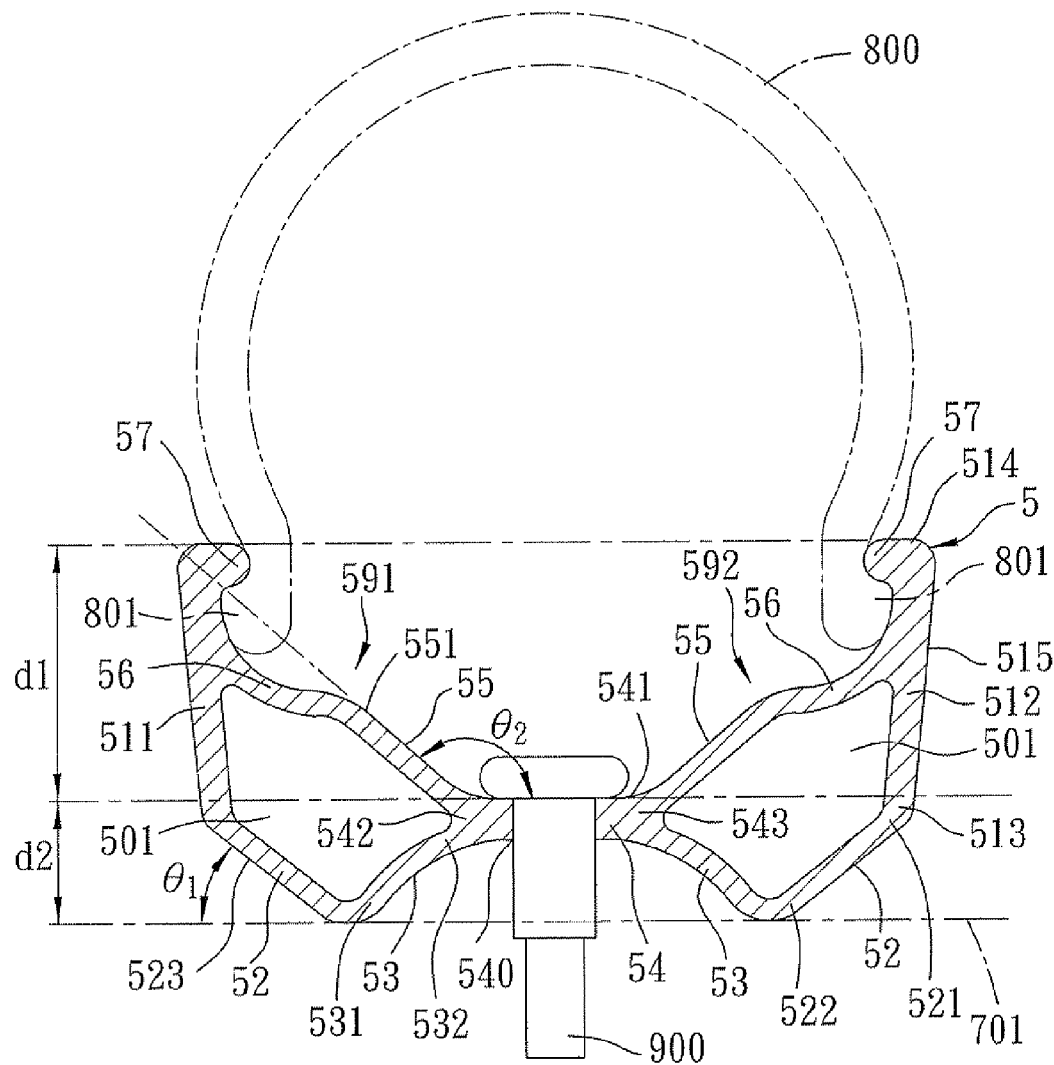
FIG. 4 is a sectional schematic view of a first preferred embodiment of a bicycle wheel rim according to the invention.
Figure 5:
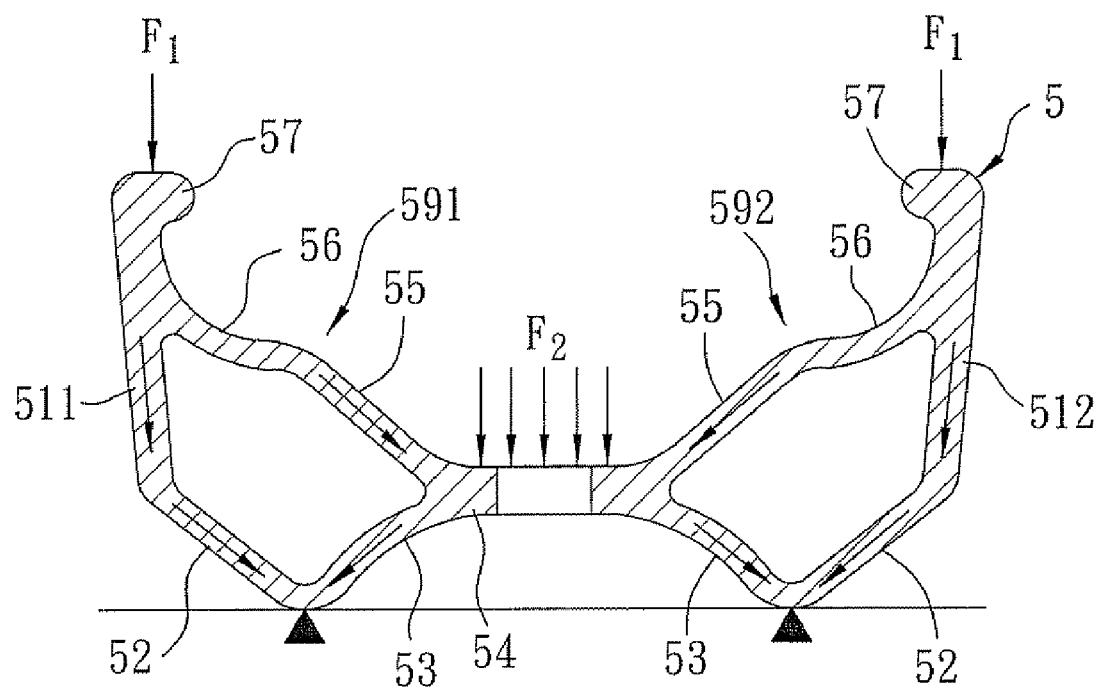
FIG. 5 is a sectional view of the first preferred embodiment, illustrating force distribution.
Figure 6:
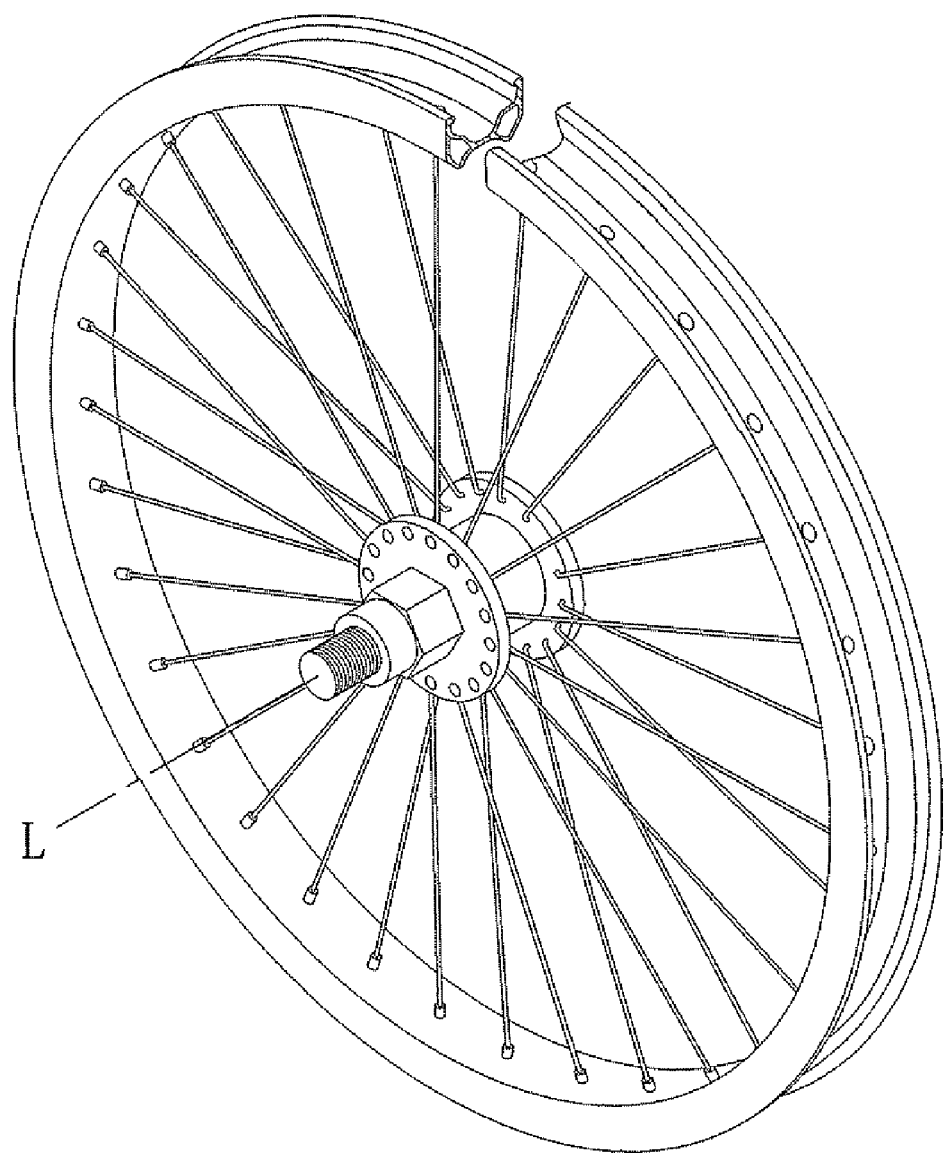
FIG. 6 is a partly sectional schematic view of the first preferred embodiment.

As shown in FIGS. 4 to 6, the first preferred embodiment of a bicycle wheel rim according to the present invention is adapted for retaining a tire 800 and a plurality of spoke fixing components 900 thereon. The first preferred embodiment of the bicycle wheel rim comprises an annular rim body 5 and a pair of connecting rods (not shown) inserted in and interconnecting adjacent ends of the rim body 5 in a conventional manner. The annular rim body 5 has a horizontally disposed rim axis (L) (see FIG. 6), and includes left and right annular side walls 511, 512, a pair of annular first oblique walls 52, a pair of annular second oblique walls 53, an annular base wall 54, left and right annular connecting walls 591, 592, and a pair of annular tire-retaining ribs 57.

The left and right annular side walls 511, 512 are spaced apart from each other and surround the rim axis (L). Each of the left and right annular side walls 511, 512 has a radial inner edge 513 and a radial outer edge 514 relative to the rim axis (L). Each of the left and right annular side walls 511, 512 further has an annular side surface 515 that is formed between the radial inner edge 513 and the radial outer edge 514, and that faces outwardly.

Each of the first oblique walls 52 extends obliquely from a respective one of the left and right annular side walls 511, 512 in radial inward directions relative to the rim axis (L). Each of the first oblique walls 52 has a first edge 521 connected to the radial inner edge 513 of the respective one of the left and right annular side walls 511, 512, and a second edge 522 opposite to the first edge 521.

Each of the second oblique walls 53 extends obliquely from a respective one of the first oblique walls 52 in radial outward directions relative to the rim axis (L). Each of the second oblique walls 53 has a first annular edge 531 connected to the second edge 522 of the respective one of the first oblique walls 52, and a second annular edge 532 opposite to the first annular edge 531.

The base wall 54 interconnects the second annular edges 532 of the second oblique walls 53, has a radial outer side 541 opposite to the rim axis (L), has opposite left and right ends 542, 543, cooperates with the second oblique walls 53 to form an arch configuration that opens toward the rim axis (L), and is formed with a plurality of spoke fixing holes 540. The spoke fixing holes 540 are angularly spaced apart from each other with respect to the rim axis (L), and are formed in a center of the base wall 54.

The left annular connecting wall 591 extends from the left end 542 of the base wall 54 to connect to the left annular side wall 511. The right annular connecting wall 592 extends from the right end 543 of the base wall 54 to connect to the right annular side wall 512. Each of the left and right annular connecting walls 591, 592 is disposed radially outward relative to a respective one of the first oblique walls 52 and a respective one of the second oblique walls 53, and cooperates with a connected one of the left and right annular side walls 511, 512, the respective one of the first oblique walls 52, and the respective one of the second oblique walls 53 to define an annular hole 501. Each of the left and right annular connecting walls 591, 592 has an extending segment 55 that extends obliquely from the base wall 54, and a connecting segment 56 that extends from the extending segment 55 to the respective one of the left and right annular side walls 511, 512.

Each of the annular tire-retaining ribs 57 protrudes from the radial outer edge 514 of a respective one of the left and right annular side walls 511, 512 toward the other one of the left and right annular side walls 511, 512.

The second edges 522 of the first oblique walls 52 are disposed on an imaginary cylindrical plane 701. In this embodiment, the ratio of a radial distance (d1) between the radial outer side 541 of the base wall 54 and the radial outer edges 514 of the left and right annular side walls 511, 512 to a radial distance (d2) between the imaginary cylindrical plane 701 and the radial outer side 541 of the base wall 54 ranges from 2.8 to 2.0. In this embodiment, the ratio is 2.33. Each of the first oblique walls 52 has a radial inner side 523 forming a first angle ($\theta_1$) with the imaginary cylindrical plane 701. The extending segment 55 of each of the left and right annular connecting walls 591, 592 has a radial outer side 551 forming a second angle ($\theta_2$) with the radial outer side 541 of the base wall 54. The left and right annular side walls 511, 512 cooperate with the first oblique walls 52, the second oblique walls 53, the base wall 54, and the left and right annular connecting walls 591, 592 to form a symmetrical truss structure with a relatively high strength. Moreover, since the lengths of the left and right annular side walls 511, 512, the first oblique walls 52, and the second oblique walls 53 are relatively short, the wheel rim of this embodiment has a lighter weight while maintaining high strength.

The first angle ($\theta_1$) ranges between 15 and 65 degrees. Preferably, the first angle ($\theta_1$) ranges between 26 and 46 degrees, and more preferably ranges between 32 and 42 degrees. In this embodiment, the first angle ($\theta_1$) is 36 degrees. When the first angle ($\theta_1$) is smaller than 15 degrees, the truss structure of the rim body 5 is not able to convey forces evenly from the left and right annular side walls 511, 512 to parts where the first oblique walls 52 are connected to the second oblique walls 53 (marked by the symbols ▲ in FIG. 5), and the configuration of the rim body 5 would be similar to that of the aforementioned co-pending patent application of the applicant, such that the weight of the rim body 5 is not effectively reduced. On the other hand, when the first angle ($\theta_1$) is larger than 65 degrees, the radial length of each of the left and right annular side walls 511, 512 is relatively short, thereby resulting in a relatively narrow side surface 515 for contacting brake pads (not shown) of a bicycle.

The second angle ($\theta_2$) ranges between 129 and 149 degrees, and preferably ranges between 134 and 144 degrees. In this embodiment, the second angle ($\theta_2$) is 139 degrees. If the second angle ($\theta_2$) is larger than 149 degrees, the truss structure of the rim body 5 is not able to convey forces from the left and right annular side walls 511, 512 to the base wall 54 via the left and right annular connecting walls 591, 592, and the strength of the truss structure of the rim body 5 will be lowered. On the other hand, if the second angle ($\theta_2$) is smaller than 129 degrees, tire beads 801 of the tire 800 that abut against the extending segments 55 are not able to slide thereon during inflation, and clamping of the spoke fixing components 900 with the use of a tool (not shown) will be difficult.

As shown in FIG. 5, when the rim body 5 is bearing forces (F1) in the radial direction, some components of force will be transmitted evenly from the left and right annular side walls 511, 512 to the second oblique walls 53 through the left and right annular connecting walls 591, 592 and the annular base wall 54, while the other components of force will be transmitted evenly from the left and right annular side walls 511, 512 to the first oblique walls 52. Finally, the force (F1) will be borne evenly by the rim body 5 at parts where the first oblique walls 52 are connected to the second oblique walls 53. Similarly, forces (F2) applied by the spoke fixing components 900 are borne evenly by the rim body 5.

Figure 7:
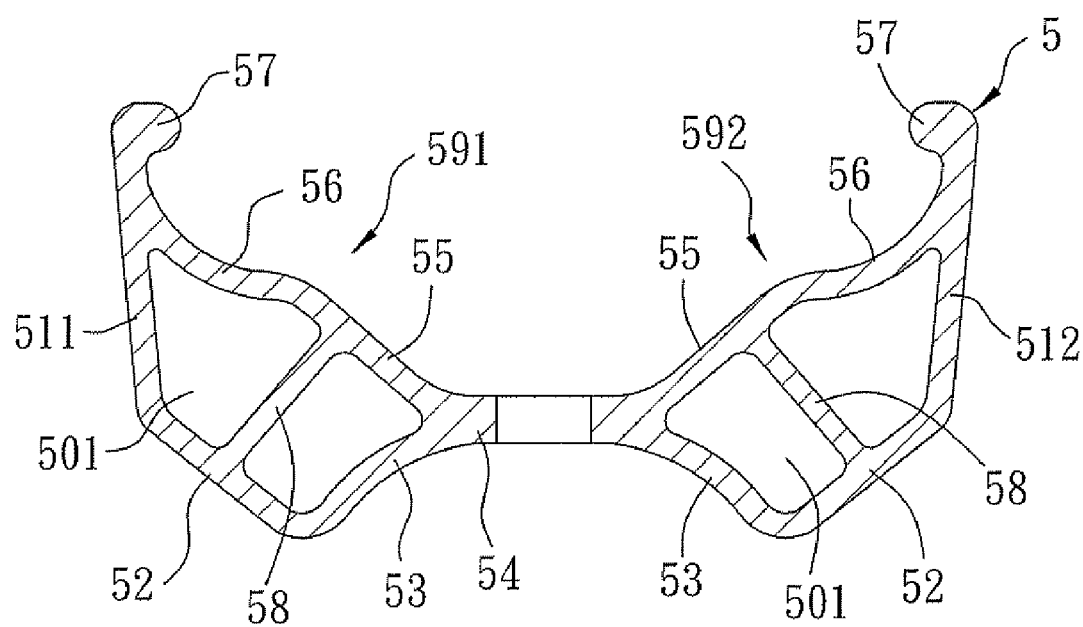
FIG. 7 is a sectional schematic view of a second preferred embodiment of a bicycle wheel rim according to the invention.

As shown in FIG. 7, the second preferred embodiment of the bicycle wheel rim according to the present invention has a structure similar to that of the first embodiment. The main difference between this embodiment and the previous embodiment resides in the inclusion of a pair of annular reinforcing walls 58, each of which is disposed in a respective one of the annular holes 501 and extends perpendicularly from a middle of a respective one of the first oblique walls 52 to the extending segment 55 of a respective one of the left and right annular connecting walls 591, 592. Each of the left and right annular sidewalls 511, 512, the first oblique walls 52, the second oblique walls 53, the base wall 54, and the left and right annular connecting walls 591, 592 has a wall thickness thinner than that of the first preferred embodiment. The second preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A bicycle wheel rim adapted for retaining a tire and a plurality of spokes thereon, said bicycle wheel rim comprising:

an annular rim body having a horizontally disposed rim axis and including left and right annular side walls that are spaced apart from each other and that surround the rim axis, each of said annular side walls having a radial inner edge and a radial outer edge relative to the rim axis, a pair of annular first oblique walls, each of which extends obliquely from a respective one of said annular side walls in radial inward directions relative to the rim axis, and each of which has a first edge connected to said radial inner edge of the respective one of said annular side walls and a second edge opposite to said first edge, said second edges of said first oblique walls being disposed on an imaginary cylindrical plane, a pair of annular second oblique walls, each of which extends obliquely from a respective one of said first oblique walls in radial outward directions relative to the rim axis, and each of which has a first annular edge connected to said second edge of the respective one of said first oblique walls and a second annular edge opposite to said first annular edge, an annular base wall that interconnects said second annular edges of said second oblique walls, that has a radial outer side opposite to the rim axis, that has opposite left and right ends, that cooperates with said second oblique walls to form an arch configuration that opens toward the rim axis, and that is formed with a plurality of spoke fixing holes, and left and right annular connecting walls, said left annular connecting wall extending from said left end of said base wall to connect to said left annular side wall, said right annular connecting wall extending from said right end of said base wall to connect to said right annular side wall, each of said left and right annular connecting walls being disposed radially outward relative to a respective one of said first oblique walls and a respective one of said second oblique walls, and cooperating with a connected one of said annular side walls, the respective one of said first oblique walls, and the respective one of said second oblique walls to define an annular hole;

wherein each of said first oblique walls has a radial inner side forming a first angle with said imaginary cylindrical plane that ranges from 15 to 65 degrees.

2. The bicycle wheel rim as claimed in claim 1, wherein said first angle ranges from 26 to 46 degrees.

3. The bicycle wheel rim as claimed in claim 2, wherein said first angle ranges from 32 to 42 degrees.

4. The bicycle wheel rim as claimed in claim 3, wherein said first angle is 36 degrees.

5. The bicycle wheel rim as claimed in claim 1, wherein each of said annular connecting walls has an extending segment that extends obliquely from said base wall, and a connecting segment that extends from said extending segment to the respective one of said annular side walls, said extending segment having a radial outer side forming a second angle with said radial outer side of said base wall that ranges from 129 to 149 degrees.

6. The bicycle wheel rim as claimed in claim 5, wherein said second angle ranges from 134 to 144 degrees.

7. The bicycle wheel rim as claimed in claim 6, wherein said second angle is 139 degrees.

8. The bicycle wheel rim as claimed in claim 1, wherein the ratio of a radial distance between said radial outer side of said base wall and said radial outer edges of said annular side walls to that between said imaginary cylindrical plane and said radial outer side of said base wall ranges from 2.8 to 2.0.

9. The bicycle wheel rim as claimed in claim 8, wherein the ratio of the radial distance between said radial outer side of said base wall and said radial outer edges of said annular side walls to that between said imaginary cylindrical plane and said radial outer side of said base wall is 2.33.

10. The bicycle wheel rim as claimed in claim 1, wherein said rim body further includes a pair of annular tire-retaining ribs, each of which protrudes from said radial outer edge of a respective one of said annular side walls toward the other one of said annular side walls.

11. The bicycle wheel rim as claimed in claim 1, wherein said spoke fixing holes are angularly spaced apart from each other with respect to the rim axis, and are formed in a center of said base wall.

12. The bicycle wheel rim as claimed in claim 1, wherein:

each of said annular connecting walls includes an extending segment that extends obliquely from said base wall, and a connecting segment that extends from said extending segment to the respective one of said annular side walls; and said rim body further includes a pair of annular reinforcing walls, each of which is disposed in a respective one of said annular holes and extends from a respective one of said first oblique walls to said extending segment of a respective one of said annular connecting walls.

13. The bicycle wheel rim as claimed in claim 12, wherein each of said reinforcing walls extends perpendicularly from the respective one of said first oblique walls to said extending segment of the respective one of said annular connecting walls.

14. The bicycle wheel rim as claimed in claim 13, wherein each of said reinforcing walls extends perpendicularly from a middle of the respective one of said first oblique walls to said extending segment of the respective one of said annular connecting walls.

* * * * *